(12) United States Patent
Okawa et al.

(10) Patent No.: US 7,142,888 B2
(45) Date of Patent: Nov. 28, 2006

(54) RADIO COMMUNICATION METHOD, BASE STATION AND MOBILE STATION

(75) Inventors: Koichi Okawa, Yokohama (JP); Shinya Tanaka, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 488 days.

(21) Appl. No.: 10/646,821

(22) Filed: Aug. 25, 2003

(65) Prior Publication Data

US 2004/0038702 A1 Feb. 26, 2004

(30) Foreign Application Priority Data

Aug. 23, 2002 (JP) ............... 2002-244314

(51) Int. Cl.
H04B 1/38 (2006.01)
H04M 1/00 (2006.01)

(52) U.S. Cl. ............... 455/561; 455/524; 455/63.4; 455/67.13; 455/103; 455/501; 455/452.1; 455/450; 370/280; 370/347; 370/348; 348/460; 348/461; 348/464; 375/130; 375/146; 375/147

(58) Field of Classification Search ............ 455/450, 455/442, 439, 452.1, 501, 67.13, 561, 562.1; 370/335, 342; 375/150; 348/460; 340/7.26
See application file for complete search history.

(56) References Cited

U.S. PATENT DOCUMENTS

| | | | | |
|---|---|---|---|---|
| 5,673,260 | A * | 9/1997 | Umeda et al. | 370/342 |
| 5,926,747 | A * | 7/1999 | Komara et al. | 455/69 |
| 5,953,325 | A | 9/1999 | Willars | |
| 6,011,787 | A * | 1/2000 | Nakano et al. | 370/335 |
| 6,108,323 | A * | 8/2000 | Gray | 370/335 |
| 6,181,941 | B1 * | 1/2001 | McCarthy | 455/436 |
| 6,330,460 | B1 | 12/2001 | Wong et al. | |
| 6,345,046 | B1 * | 2/2002 | Tanaka | 370/342 |
| 6,385,181 | B1 * | 5/2002 | Tsutsui et al. | 370/335 |
| 6,504,515 | B1 * | 1/2003 | Holt et al. | 343/853 |
| 6,542,484 | B1 * | 4/2003 | Ovesjo et al. | 370/335 |
| 6,694,155 | B1 * | 2/2004 | Chin et al. | 455/562.1 |

(Continued)

FOREIGN PATENT DOCUMENTS

CN 1242894 A 1/2000

(Continued)

OTHER PUBLICATIONS

S. Tanaka, et al., IEICE Transactions on Fundamentals of Electronics, Communications and Computer Sciences, vol. E80-A, No. 12, pp. 2445-2454, "Pilot Symbol-Assisted Decision-Directed Coherent Adaptive Array Diversity for DS-CDMA Mobile Radio Reverse Link", Dec. 1997.

(Continued)

Primary Examiner—Marceau Milord
(74) Attorney, Agent, or Firm—Oblon, Spivak, McClelland, Maier & Neustadt, P.C.

(57) ABSTRACT

The object of the present invention is to improve the accuracy of channel estimation and increase downlink capacity when a base station transmits an individual channel using directional beams. The base station 10 according to the present invention comprises an individual channel transmitter 15 configured to transmit an individual channel into which pilot symbols are inserted; and an individual channel format creator 14 configured to create a format of the individual channel. The individual channel format creator 14 changes between a format of an individual channel which is to be transmitted using directional beams and a format of an individual channel which is to be transmitted using non-directional beams.

9 Claims, 12 Drawing Sheets

U.S. PATENT DOCUMENTS 6,784,838 B1 * 8/2004 Howell .................. 342/377
6,804,216 B1 * 10/2004 Kuwahara et al. .......... 370/335
6,882,681 B1 * 4/2005 Sano .................. 375/148

FOREIGN PATENT DOCUMENTS

EP    0 674 451 A2    9/1995

OTHER PUBLICATIONS

H. Taoka, et al., IEEE Wireless Communications, pp. 34-41, "Adaptive Antenna Array Transmit Diversity in FDD Forward Link for W-CDMA and Broadband Packet Wireless Access", Apr. 2002.

* cited by examiner

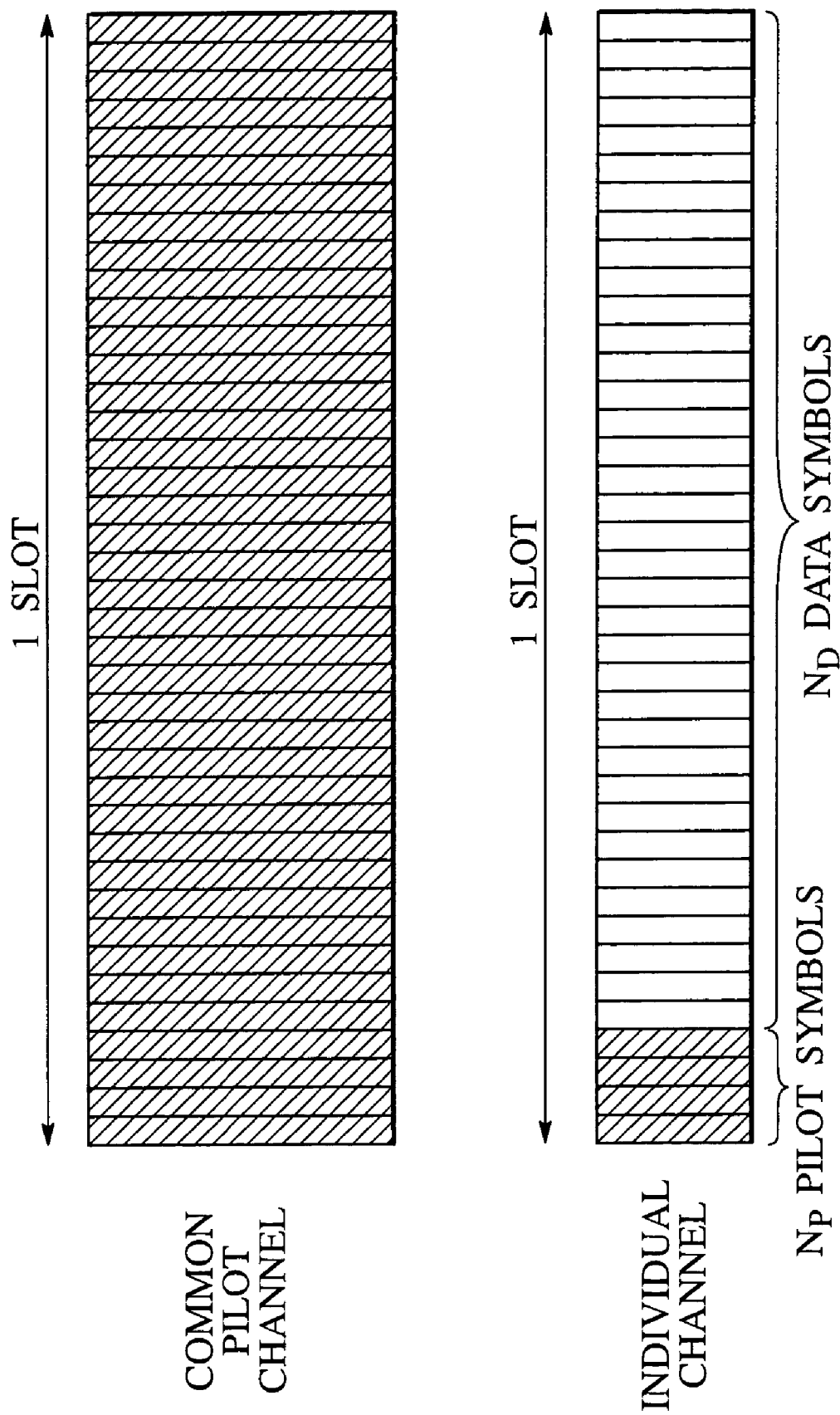

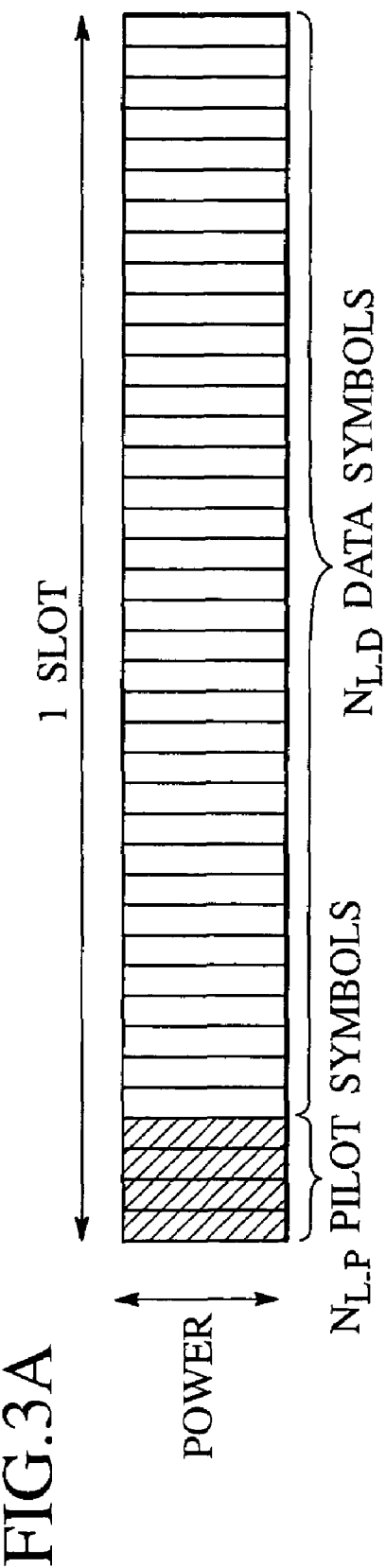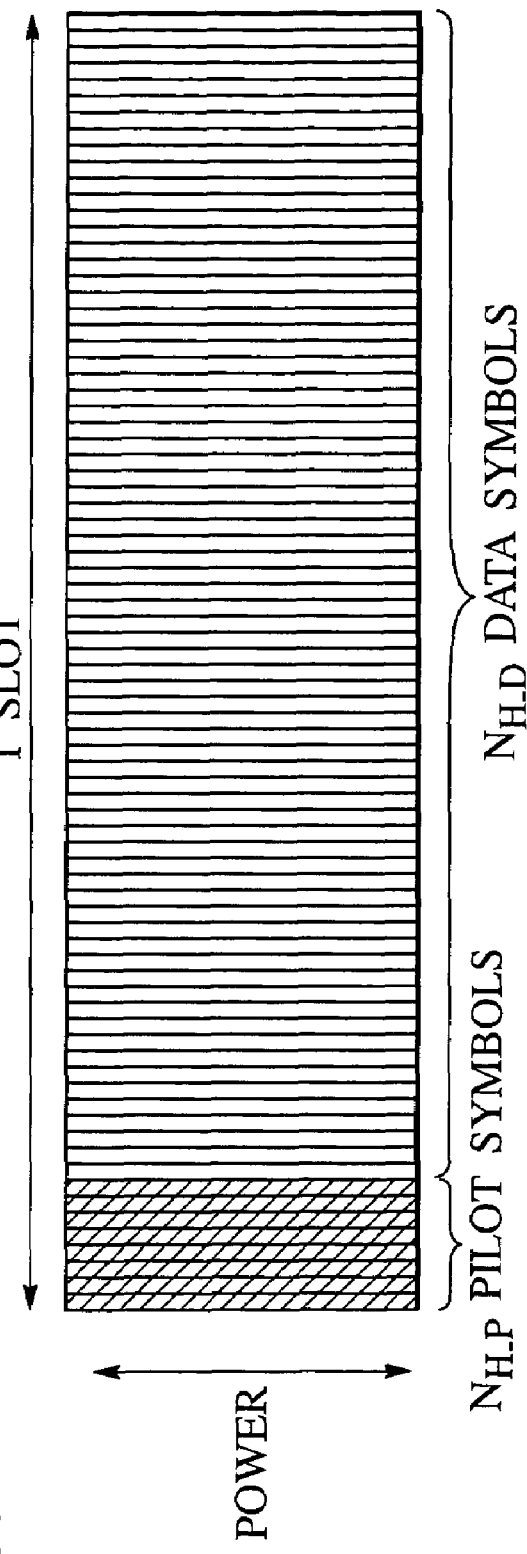

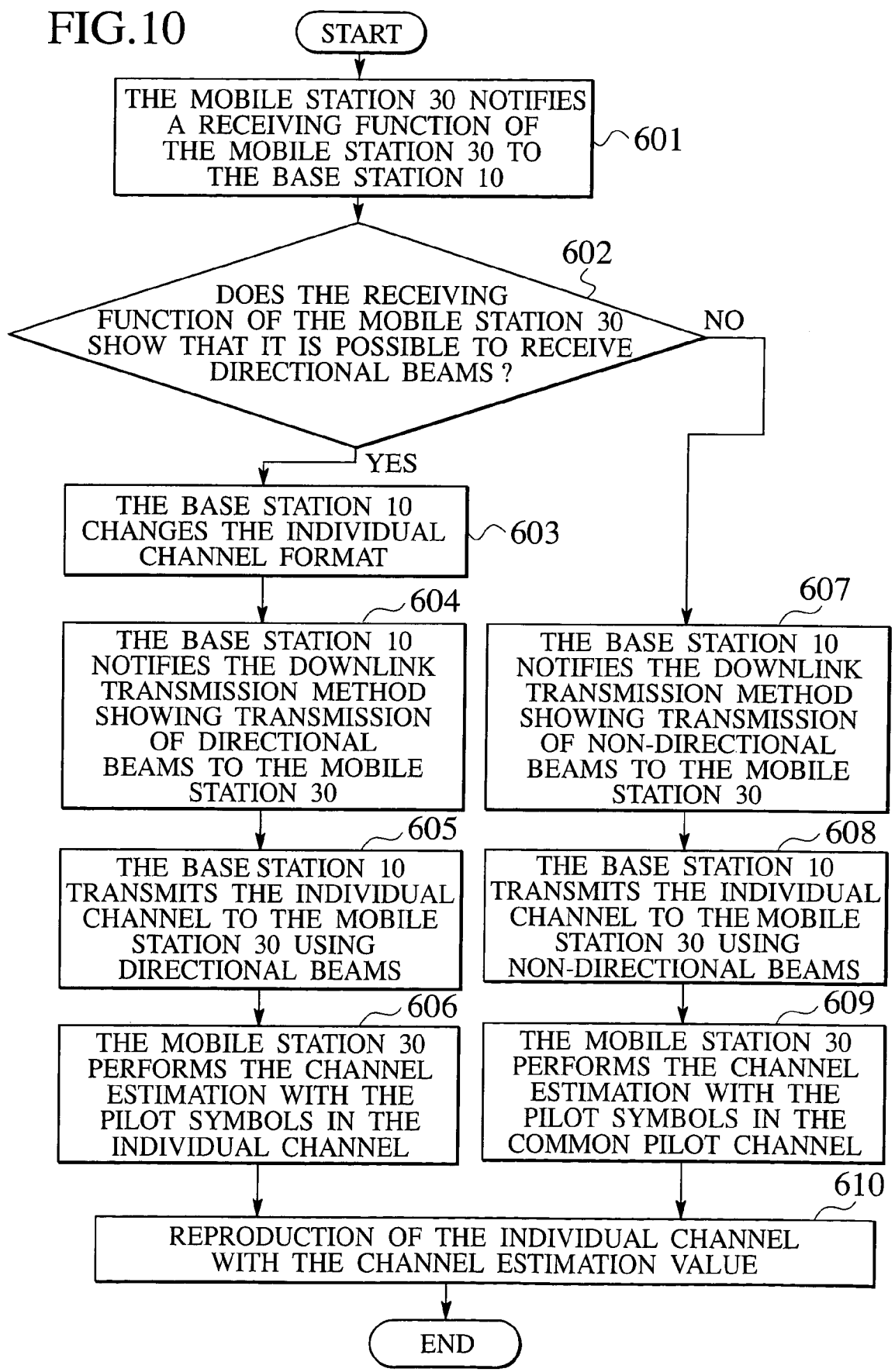

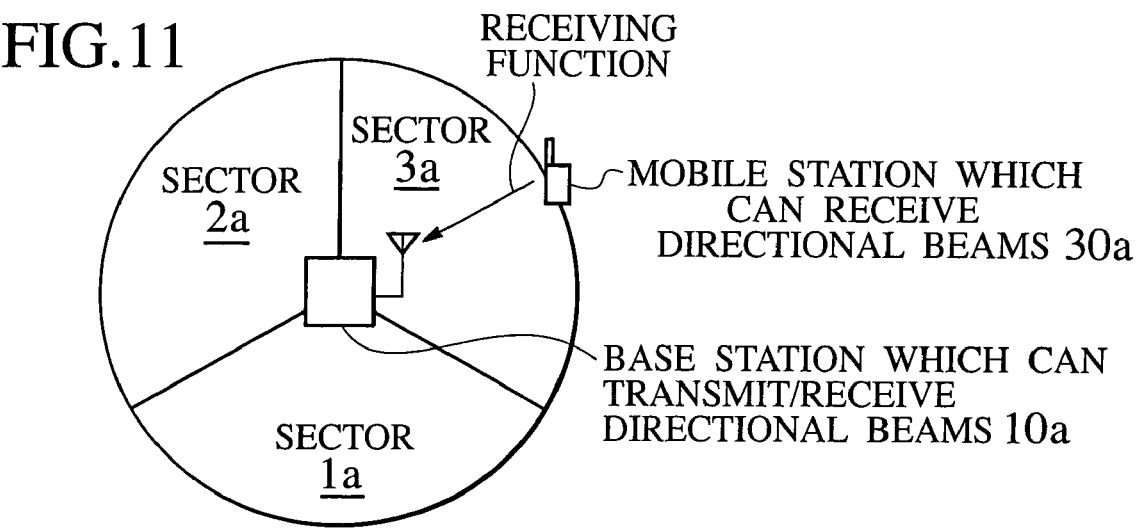
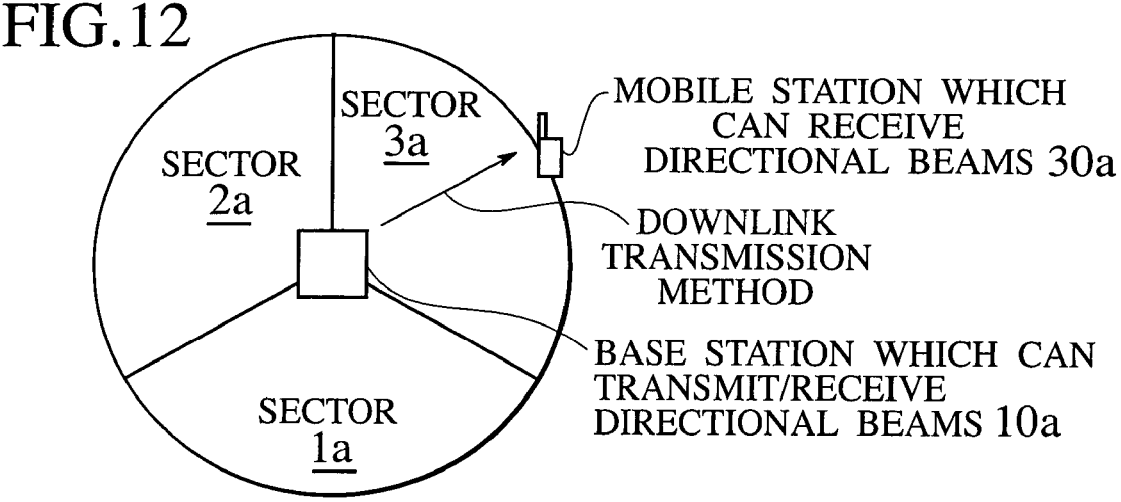
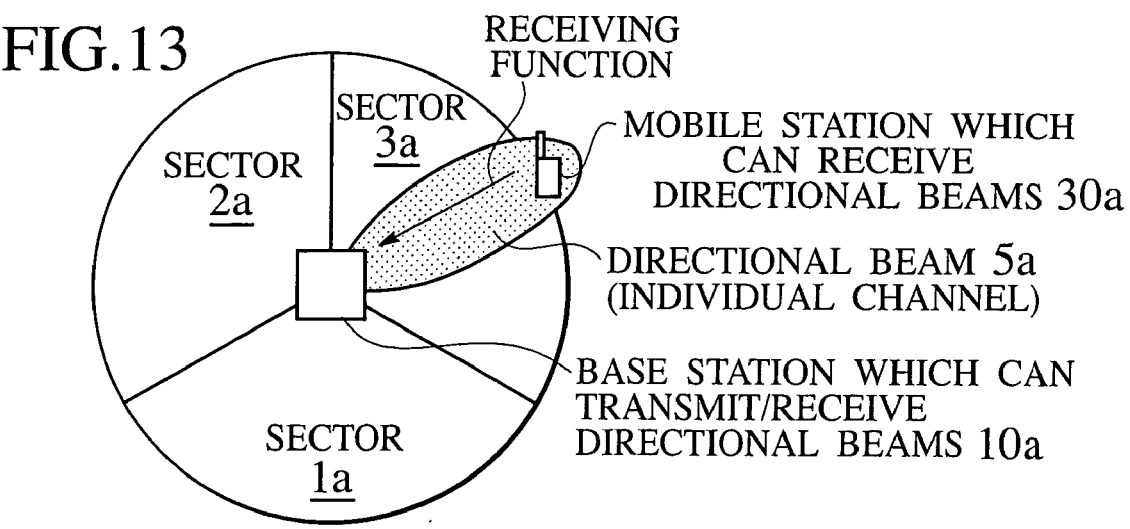

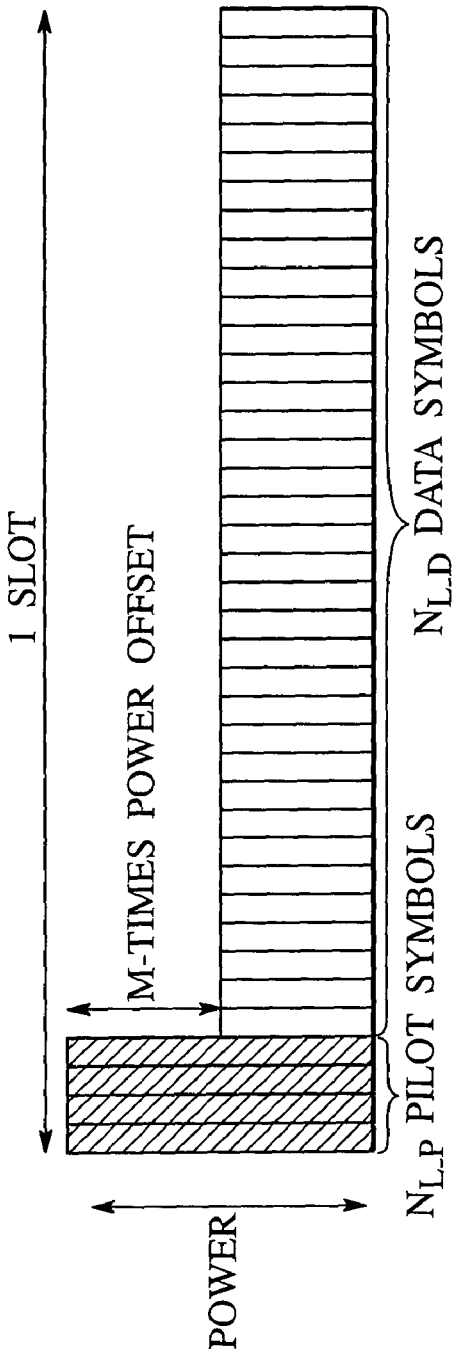
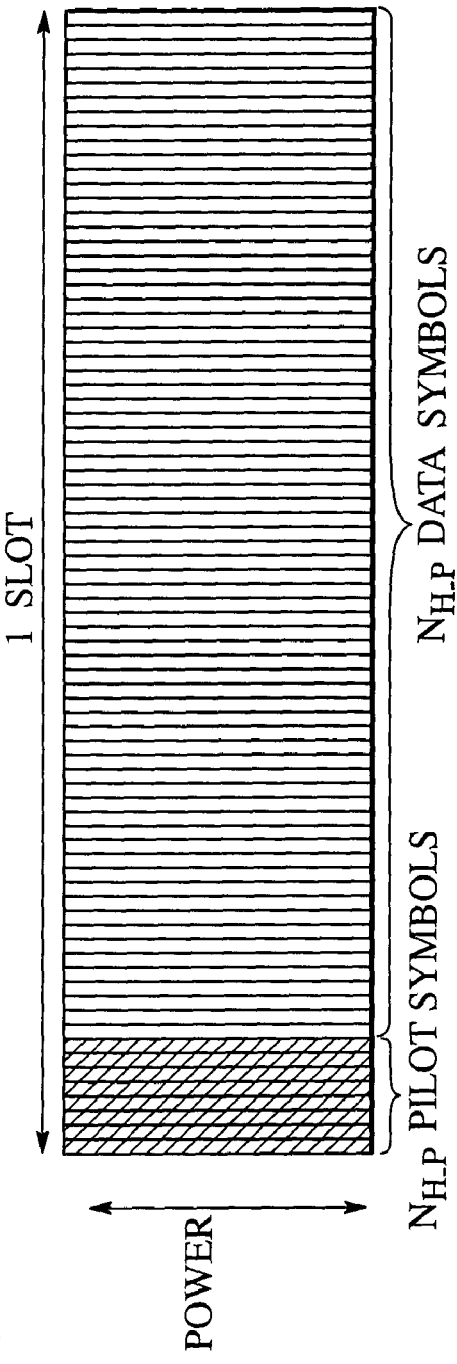
FIG.14A
FIG.14B

RADIO COMMUNICATION METHOD, BASE STATION AND MOBILE STATION

CROSS REFERENCE TO RELATED APPLICATION

This application is based upon and claims the benefit of priority from the prior Japanese Patent Application No. P2002-244314, filed on Aug. 23, 2002; the entire contents of which are incorporated herein by reference.

BACKGROUND OF THE INVENTION

1. Field of the Invention

The present invention relates to a radio communication method, a base station and a mobile station which can be used in the radio communication method.

Particularly, the present invention relates to a radio communication method using a CDMA (Code Division Multiple Access) method with the spread spectrum technique and having the cellular configuration, a base station and a mobile station which can be used in the radio communication method.

2. Description of the Related Art

Conventionally, a DS-CDMA (Direct Sequence CDMA) system in which a plurality of mobile stations performs radio communication using the same frequency band is known. In the DS-CDMA system, each mobile station is identified with spreading codes, and orthogonal codes such as Gold codes are used as the spreading codes.

In the DS-CDMA system, while a signal from a specific mobile station is despread in a receiver (a base station), an interference signal power from other mobile stations becomes "a transmission signal power of the other mobile stations/PG (Processing Gain)" on average. Particularly, a signal from each mobile station is influenced by an instantaneous variation, a short-term variation and a distance variation caused by each independent fading in the base station, under asynchronous environments in the uplink direction.

Therefore, the signal from each mobile station is satisfied with a required receiving quality in the base station, using a transmission power control in which SIR (Signal to Interference Power Ratio) is controlled to be constant in the base station.

In the conventional DS-CDMA system, however, there is a problem in that the spreading codes are not completely orthogonal, and the signal from a specific mobile station is influenced by the interference signal power from other mobile stations (a mutual correlation) under multi-path environments, even though the above transmission power control is performed completely, and the SIR is ensured to be constant in the base station.

In other words, there is a problem in that the interference signal power increases and the communication capacity per one cell is reduced, as the number of mobile stations performing the radio communication in the same frequency band increases under the multi-path environments in the conventional DS-CDMA system.

In order to solve the problems, an interference cancellation technique which can reduce the influence of the interference signal power from other mobile stations is known.

An adaptive antenna array diversity technique is known as the interference cancellation technique. The adaptive antenna array diversity technique realizes transmission and reception of directional beams by assigning adaptive weights to signals received in each of a plurality of antennas, and reduces the interference signal power from other mobile stations.

For example, a coherent adaptive antenna array diversity (CAAAD) receiving system is proposed, in the technical literature "Pilot symbol-assisted decision-directed coherent adaptive antenna array diversity for DS-CDMA mobile radio reverse link, IEICE Tans. Fundamentals, vol. E-80-A, pp. 2445–2454, December 1997. (S. Tanaka, M. Sawahashi and F. Adachi)", as a type of the adaptive antenna array diversity technique.

Referring to FIG. 1, the CAAAD receiving system will be explained briefly.

First, a base station adopting the CAAAD receiving system receives signals transmitted from mobile stations at M antennas $101_1$ to $101_M$.

Second, the base station multiplies signals $y_{k,m,l}$ (m=1 to M) despread via antennas $101_m$, a RF radio unit 102 and matched filters $103_m$, by weighting factors (antenna weight values) w (w=$w_1$ to $w_M$) provided by a weighting factor controlling unit 104. The base station combines the multiplied signals in an adding unit 105.

The signals $y_{k,m,l}$ are acquired by despreading signals received over a path #1 with a mobile station #k at the antennas $101_m$ (m=1 to M). The combined signal $z_{k,l}$ is represented by the following expression.

$$z_{k,l} = \sum_{m=1}^{M} y_{k,m,l} \cdot w_m$$

Third, the base station performs phase variation estimation using known pilot symbols inserted into a signal from the mobile station periodically at a phase variation estimating unit 106, so as to obtain a phase variation estimation value.

The base station performs a phase variation compensation on the combined signal $Z_{k,l}$ using the phase variation estimation value $$\vec{\xi}_{k,l}$$

obtained by the phase variation estimating unit 106 at a phase variation compensating unit 107, and performs a Rake combining. The signal on which the Rake combining is performed $z_k$ is represented by the following expression.

$$z_k = \sum_{l=1}^{L} z_{k,l} \cdot \xi_{k,l}^*$$

Fourth, the base station performs a phase identification and judgment process on the signal $z_k$ at a identifying and judging unit 108, and reproduces and outputs the transmitted data.

Then, the base station calculates an error vector using the above phase variation estimation value and an error signal at an estimated phase variation multiplying unit 109. The error signal is a difference between the signal on which the phase variation compensation is performed and the signal on which the identification and judgment process is performed.

A weighting factor controlling unit (MMSE) 104 updates the weighting factor w per symbol forming the signal from the mobile station, using the error vector and output signals from matched filters $103_1$ to $103_M$, so as to minimize the above error signal. A LMS (Least Mean Square) algorithm or RLS (Recursive Least Square) algorithm is used as an algorithm for updating the weighting factor w.

The base station compares a reference SIR with a received SIR calculated based on the above combined signal $z_{k,l}$ at an SIR measuring unit 110, so as to create a transmission power control signal which is to be transmitted to the mobile station.

As a result, the base station adopting the CAAAD receiving system allows the reduction of the interference signal power from other mobile stations, by forming and receiving directional beams each mobile station individually.

An adaptive antenna array transmission method is proposed in the technical literature "Adaptive antenna array transmit diversity in FDD forward link for WCDMA and broadband packet wireless access, IEEE Wireless Communications, pp.2–10, April. 2002. (H. Taoka, S. Tanaka, T. Ihara and M. Sawahashi)". The adaptive antenna array transmission method compensates a beam pattern formed in an uplink for the amplitude variation and the phase variation which occur in radio transmission paths in a downlink, and transmits directional beams.

FIG. 2 shows an example of configurations of downlink channels in the DS-CDMA system using the above method.

As shown in FIG. 2, the downlink channels in the DS-CDMA system include a common pilot channel and an individual channel. The pilot symbols are time-division multiplexed in the whole of one slot in the common pilot channel. $N_D$ data symbols and $N_P$ pilot symbols are time-division multiplexed in one slot in the individual channel.

FIG. 3A shows a format of the individual channel for low speed in the DS-CDMA system, and FIG. 3B shows a format of the individual channel for high speed in the DS-CDMA system.

As shown in FIG. 3A, $N_{L\_D}$ data symbols and $N_{L\_P}$ pilot symbols are inserted into one slot in the individual channel for low speed periodically.

As shown in FIG. 3B, $N_{H\_D}$ data symbols ($N_{H\_D} > N_{L\_D}$) and $N_{H\_P}$ pilot symbols ($N_{H\_P} > N_{L\_P}$) are inserted into one slot in the individual channel for low speed periodically.

Generally, when the base station does not adopt the transmission of directional beams in the radio communication system, the mobile station performs channel estimation with the pilot symbols in the common pilot channel transmitted using non-directional beams, so as to compensate for the influence of the channel variation (the phase variation, the amplitude variation and so on) resulting from the fading which occurs in the radio transmission paths.

On the other hand, when the base station adopts the transmission of directional beams in the radio communication system, the base station forms directional beams in the direction of required signal, and transmits the individual channel using the directional beams.

As shown in FIG. 4, to be more specific, the base station 10 transmits the individual channel to the mobile station 30#1 via the antenna 101 using the transmission beam pattern for the mobile station 30#1 (a solid line), and transmits the individual channel to the mobile station 30#2 via the antenna 101 using the transmission beam pattern for the mobile station 30#2 (a dotted line).

In this case, power delay profiles in the radio transmission paths from the base station to the mobile station are different between the common pilot channel transmitted using non-directional beams and the individual channel transmitted using directional beams, and the pilot symbols inserted into the common pilot channel are not used in channel estimation, so that the channel estimation needs to be performed with the pilot symbols inserted into the individual channel.

However, there is a problem in that the power of the pilot symbols inserted into the individual channel is less than the power of the pilot symbols inserted into the common pilot channel, so that the accuracy of channel estimation is degraded, when the channel estimation with the pilot symbols inserted into the individual channel is performed in the conventional interference cancellation technique.

There is a problem in that the number of individual channels for low speed is less than the number of individual channels for high speed per one slot, and the power assigned to the pilot symbols inserted into the individual channel is low, so that the effect of averaging noise and interference signal power is little, the accuracy of channel estimation with the pilot symbols inserted into the individual channel is degraded, and downlink capacity is degraded.

BRIEF SUMMARY OF THE INVENTION

In viewing of the foregoing, it is an object of the present invention to provide a radio communication method which improves the accuracy of channel estimation in a mobile station and increases downlink capacity by changing an individual channel format when a base station transmits an individual channel using directional beams, the base station and the mobile station preferably used for this method.

A first aspect of the present invention is summarized as a radio communication system comprising a first base station which can transmit and receive directional beams, a second base station which cannot transmit and receive directional beams, a first mobile station which can receive directional beams, and a second mobile station which cannot receive directional beams. The first base station comprises an individual channel transmitter configured to transmit an individual channel into which pilot symbols, and an individual channel format creator configured to create a format of the individual channel. The individual channel format creator changes between a format of an individual channel which is to be transmitted using directional beams and a format of an individual channel which is to be transmitted using non-directional beams.

In the first aspect, the first base station may comprise a downlink transmission method notifier configured to notify a downlink transmission method showing that directional beams or non-directional beams are to be transmitted in a downlink, to the first mobile station.

In the first aspect, the first mobile station and the second mobile station may comprise a receiving function notifier configured to notify a receiving function showing whether it is possible to receive directional beams or not, to the first base station.

In the first aspect, the individual channel format creator may change the format of the individual channel, in accordance with transmission rate of the individual channel.

In the first aspect, the individual channel format creator may increase the number of pilot symbols which are to be inserted into one slot of the individual channel, when the individual channel is transmitted using directional beams.

In the first aspect, the individual channel format creator may increase the power of the pilot symbols which are to be inserted into the individual channel, when the individual channel is transmitted using directional beams.

In the first aspect, the individual channel format creator may increase the power of the pilot symbols which are to be inserted into the individual channel, when the first mobile station performs a hand-over communication with the plurality of first base stations, and when the number of first base stations which transmit the individual channels using directional beams to the first mobile station is more than a predetermined number.

In the first aspect, the first mobile station may comprise a channel estimator configured to perform channel estimation using the pilot symbols, and a channel switcher configured to switch between channel estimation using pilot symbols inserted into an individual channel and channel estimation using pilot symbols inserted into a common pilot channel, in accordance with the downlink transmission method.

A second aspect of the present invention is summarized as a radio communication method comprising the steps of: (A) notifying a receiving function showing that it is possible to receive directional beams, from the first mobile station which can receive directional beams to a first base station which can receive directional beams; (B) changing a format of an individual channel which is to be transmitted using directional beams by the first base station; (C) notifying a downlink transmission method showing that directional beams are to be transmitted in a downlink, from the first base station to the first mobile station; (D) transmitting the individual channel using directional beams, from the first base station to the first mobile station; and (E) performing channel estimation using pilot symbols inserted into the individual channel, in accordance with the downlink transmission method.

In the second aspect, a second mobile station which cannot receive directional beams may notify the receiving function showing that it is impossible to receive directional beams to the first base station in the step (A); the first base station may notify the downlink transmission method showing that non-directional beams are to be transmitted in a downlink in the step (C); the first base station may transmit a common pilot channel using non-directional beams to the second mobile station in the step (D); the second mobile station may perform channel estimation with the pilot symbols inserted into the common pilot channel in the step (E).

In the second aspect, the first base station may change the format of the individual channel, in accordance with transmission rate of the individual channel in the step (B).

In the second aspect, the first base station may increase the number of pilot symbols which are to be inserted into one slot of the individual channel, when the individual channel is transmitted using directional beams, in the step (B).

In the second aspect, the first base station may increase the power of the pilot symbols which are to be inserted into the individual channel, when the individual channel is transmitted using directional beams, in the step (B).

A third aspect of the present invention is summarized as a base station comprising: an individual channel transmitter configured to transmit an individual channel into which pilot symbols are inserted; and an individual channel format creator configured to create a format of the individual channel. The individual channel format creator changes between a format of an individual channel which is to be transmitted using directional beams and a format of an individual channel which is to be transmitted using non-directional beams.

In the third aspect, the base station may comprise a downlink transmission method notifier configured to notify a downlink transmission method showing that directional beams or non-directional beams are to be transmitted in a downlink.

In the third aspect, the individual channel format creator may change the format of the individual channel, in accordance with transmission rate of the individual channel In the third aspect, the individual channel format creator may increase the number of pilot symbols which are to be inserted into one slot of the individual channel, when the individual channel is transmitted using directional beams.

In the third aspect, the individual channel format creator may increase the power of the pilot symbols which are to be inserted into the individual channel, when the individual channel is transmitted using directional beams.

In the third aspect, the individual channel format creator may increase the power of the pilot symbols which are to be inserted into the individual channel, when a mobile station performs a hand-over communication with a plurality of base stations, and when the number of base stations which transmit the individual channels using directional beams to the mobile station is more than a predetermined number.

A fourth aspect of the present invention is summarized as a mobile station comprising: a channel estimator configured to perform channel estimation using pilot symbols; a downlink transmission method receiver configured to receive a downlink transmission method showing that directional beams or non-directional beams are to be transmitted in a downlink; and a channel switcher configured to switch between channel estimation using pilot symbols inserted into an individual channel and channel estimation using pilot symbols inserted into a common pilot channel, in accordance with the downlink transmission method.

In the fourth aspect, the mobile station may comprise a receiving function notifier configured to notify a receiving function showing whether it is possible to receive directional beams or not.

BRIEF DESCRIPTION OF THE SEVERAL VIEWS OF THE DRAWINGS

FIG. 2 is a diagram showing an example of formats of an individual channel and a common pilot channel used in the conventional radio communication system.

FIG. 3A is a diagram showing an example of formats of an individual channel for low speed used in the conventional radio communication system.

FIG. 3B is a diagram showing an example of formats of an individual channel for high speed used in the conventional radio communication system.

FIG. 10 is a flowchart illustrating the operation of the radio communication system according to the embodiment.

FIG. 11 is a diagram illustrating a situation in which a mobile station notifies a receiving function to a base station in the radio communication system according to the embodiment.

FIG. 12 is a diagram illustrating a situation in which the base station notifies a downlink transmission method to the mobile station in the radio communication system according to the embodiment.

FIG. 13 is a diagram illustrating a situation in which the base station transmits an individual channel using directional beams to the mobile station in the radio communication system according to the embodiment.

FIG. 14A is a diagram showing an example of formats of an individual channel for low speed used in the radio communication system according to a first modification.

FIG. 14B is a diagram showing an example of formats of an individual channel used in the radio communication system according to a second modification.

DETAILED DESCRIPTION OF THE INVENTION

<A Configuration of a Radio Communication System According to an Embodiment of the Present Invention>

Referring to FIG. 5 to FIG. 9, a configuration of a radio communication system according to an embodiment of the present invention will be explained.

Figure 1:
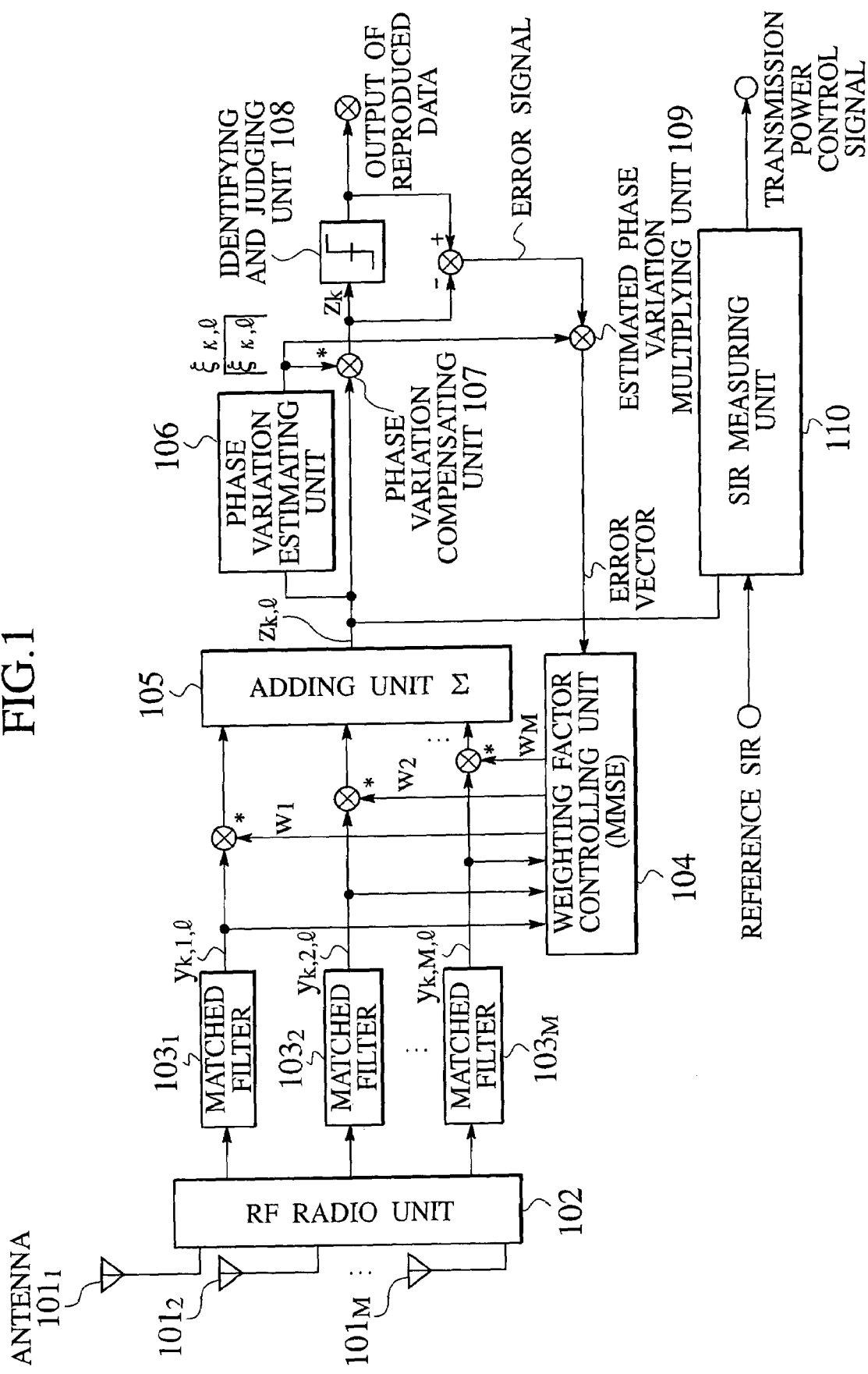
FIG. 1 is a diagram for explaining a function of a base station adopting the conventional CAAAD receiving system.
Figure 4:
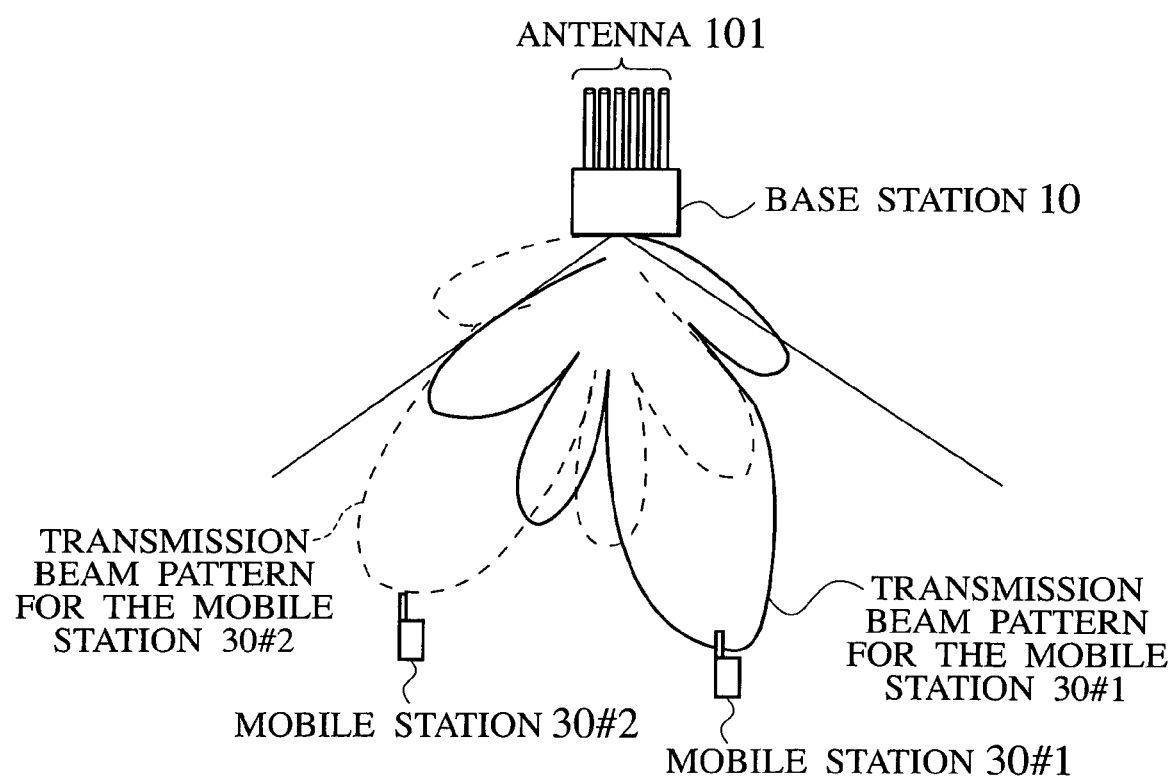
FIG. 4 is a diagram illustrating a situation in which a base station transmits directional beams in a downlink in the conventional radio communication system.
Figure 5:
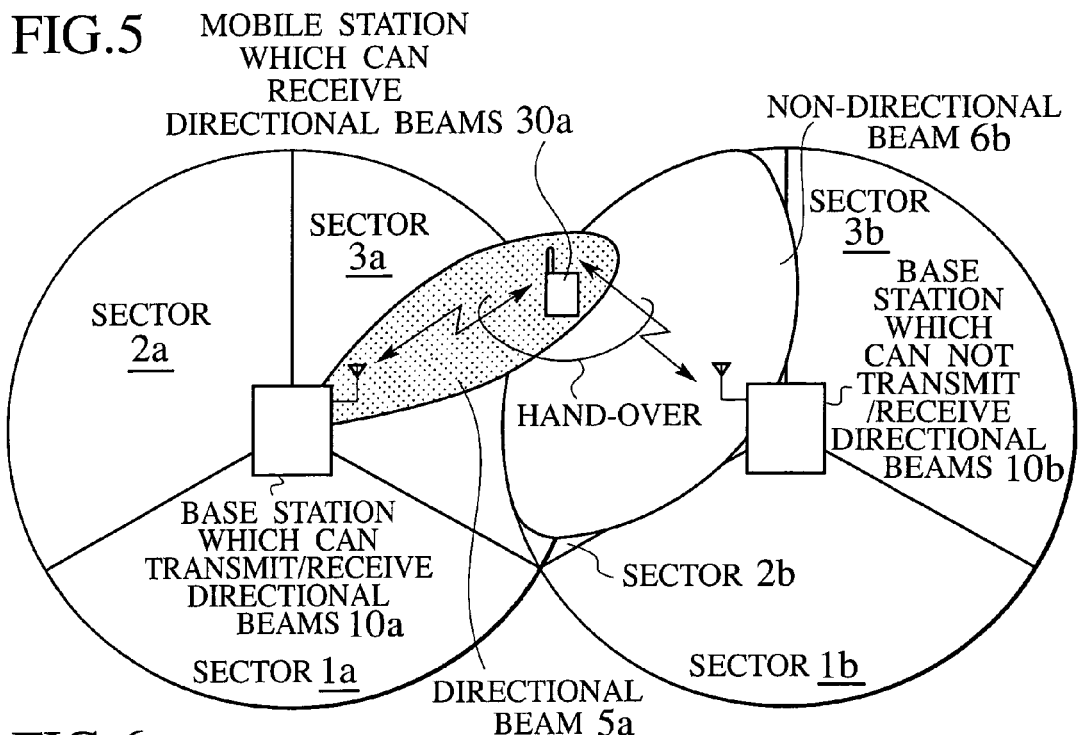
FIG. 5 is a diagram illustrating the entire structure of the radio communication system according to an embodiment of the present invention.
Figure 6:
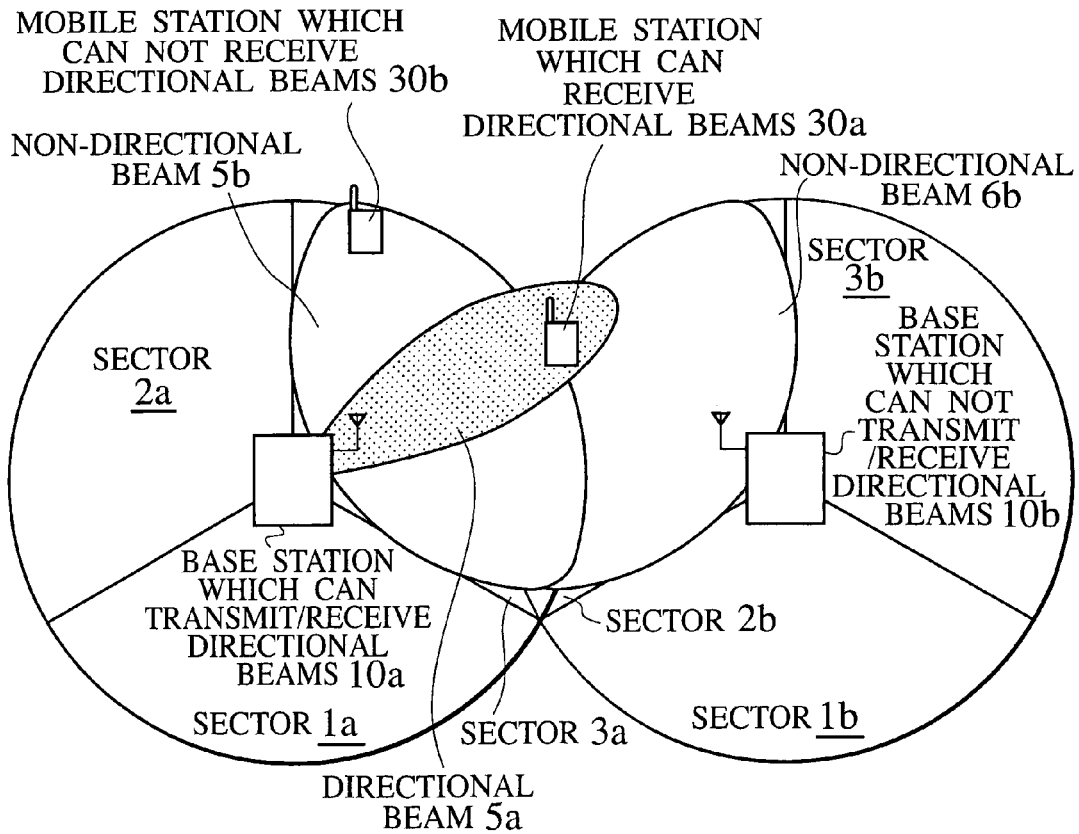
FIG. 6 is a diagram illustrating the entire structure of the radio communication system according to the embodiment.

As shown FIG. 5 and FIG. 6, the radio communication system according to the embodiment comprises a first base station 10a, a second base station 10b, a first mobile station 30a and a second mobile station 30b. The first base station 10a can transmit and receive directional beams, and the second base station 10a cannot transmit and receive directional beams. The first mobile station can receive directional beams, and the second mobile station cannot receive directional beams.

FIG. 5 shows a situation in which the first base station 10a and the second base station 10b are mixed. The first base station 10a manages a radio communication within a cell consisting sectors 1a to 3a, the second base station 10b manages a radio communication within a cell consisting sectors 1b to 3b.

In FIG. 5, the first mobile station 30a performs a handover with the first base station 10a and the second base station 10b. The first base station 10a transmits a radio signal (an individual channel) using a directional beam 5a to the first mobile station 30a in a downlink, and the second base station 10b transmits a radio signal (an individual channel) using a non-directional beam 6b to the first mobile station 30a in a downlink.

FIG. 6 shows a situation in which the first mobile station 30a and the second mobile station 30b are mixed.

In FIG. 6, the first base station 10a transmits a radio signal (an individual channel) using a directional beam 5a to the first mobile station 30a in a downlink, and transmits a radio signal (an individual channel) using a non-directional beam 5b to the second mobile station 30b in a downlink. The second base station 10b transmits a radio signal (an individual channel) using a non-directional beam 6b to the second mobile station 30b in a downlink.

Figure 7:
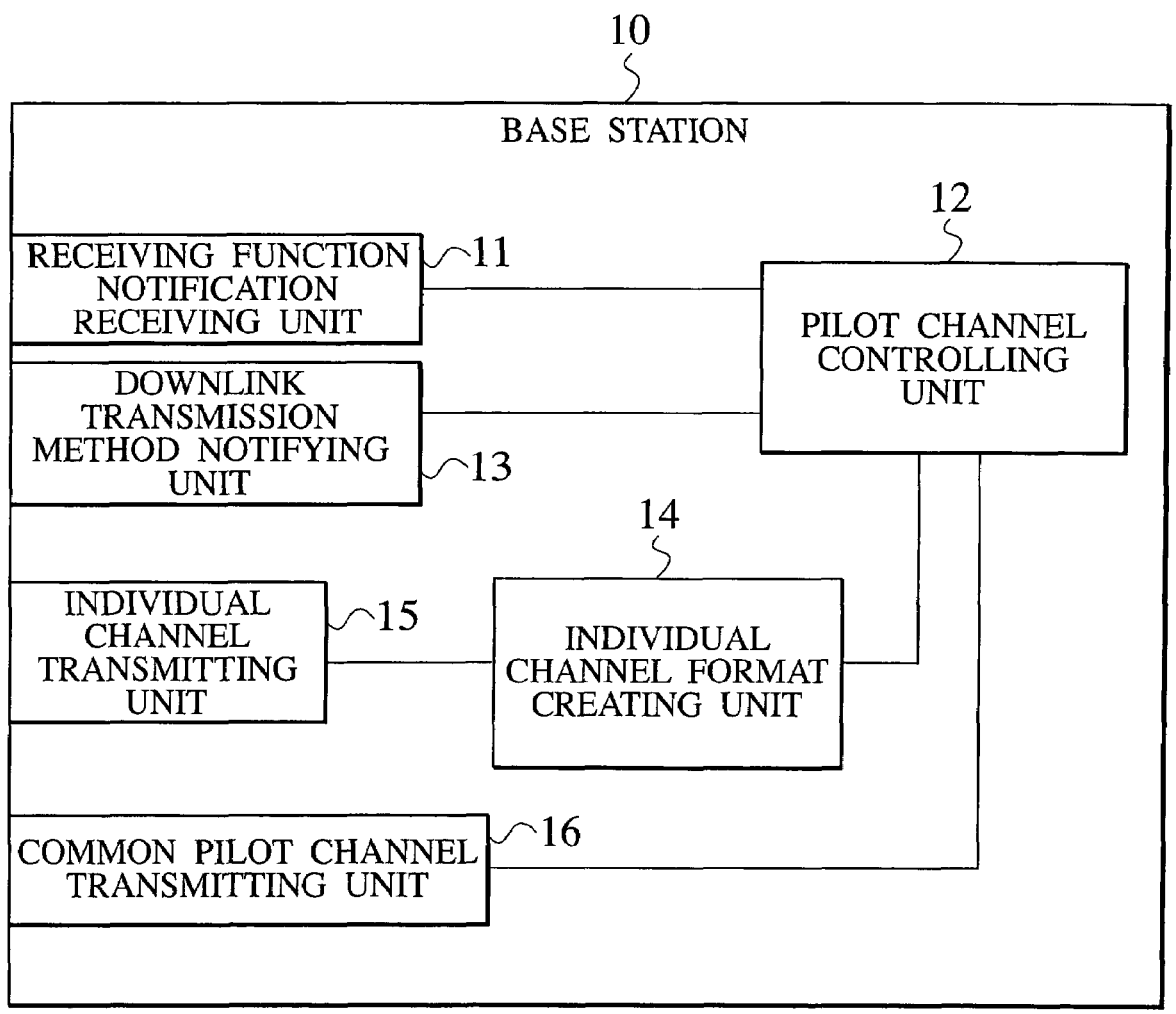
FIG. 7 is a functional block diagram of a first base station in the radio communication system according to the embodiment.

FIG. 7 shows a functional block of the first base station 10a. As shown FIG. 7, the first base station 10a comprises a receiving function notification receiving unit 11, a pilot channel controlling unit 12, a downlink transmission method notifying unit 13, an individual channel format creating unit 14, an individual channel transmitting unit 15 and a common pilot channel transmitting unit 16, as functions relating to the present invention.

The receiving function notification receiving unit 11, which is connected to the pilot channel controlling unit 12, is configured to a receiving function transmitted from the first mobile station 30a or the second mobile station 30b, and to transmit the receiving function to the pilot channel controlling unit 12. The receiving function shows whether it is possible to receive directional beams or not.

The pilot channel controlling unit 12 is connected to the receiving function notification receiving unit 11, the downlink transmission method notifying unit 13, the individual channel format creating unit 14 and the common pilot channel transmitting unit 16. The pilot channel controlling unit 12 is configured to control the downlink transmission method notifying unit 13, the individual channel format creating unit 14 and the common pilot channel transmitting unit 16.

To be more specific, the pilot channel controlling unit 12 determines to transmit the individual channel using directional beams or non-directional beams, in accordance with the receiving function received from the receiving function notification receiving unit 11, and notifies the result of the determination to the downlink transmission method notifying unit 13 and the individual channel format creating unit 14.

The pilot channel controlling unit 12 instructs the method for inserting the pilot symbols (an inserting cycle, an inserting position and so on) to the individual channel format creating unit 14 and the common pilot channel transmitting unit 16.

The downlink transmission method notifying unit 13, which is connected to the pilot channel controlling unit 12, is configured to notify the "downlink transmission method" to the mobile station 30, in accordance with the result of the determination transmitted from the pilot channel controlling unit 12. The downlink transmission method shows that directional beams or non-directional beams are to be transmitted in a downlink.

The individual channel format creating unit 14, which is connected to the pilot channel controlling unit 12 and the individual channel transmitting unit 15, is configured to create a format of the individual channel.

The individual channel format creating unit 14 is configured to change the format of the individual channel, when the result of the determination transmitted from the pilot channel controlling unit 12 shows that the individual channels are transmitted using directional beams.

The individual channel format creating unit 14 may change the format of the individual channel in accordance with transmission rate of the individual channel, when the individual channel is transmitted using directional beams.

To be more specific, the individual channel format creating unit 14 is configured to change the format of the individual channel for low speed, by increasing the number of pilot symbols which are to be inserted into one slot of the individual channel for low speed, when the individual channel is transmitted using directional beams, and when the transmission rate of the individual channel is defined as "low speed".

Figure 8A:
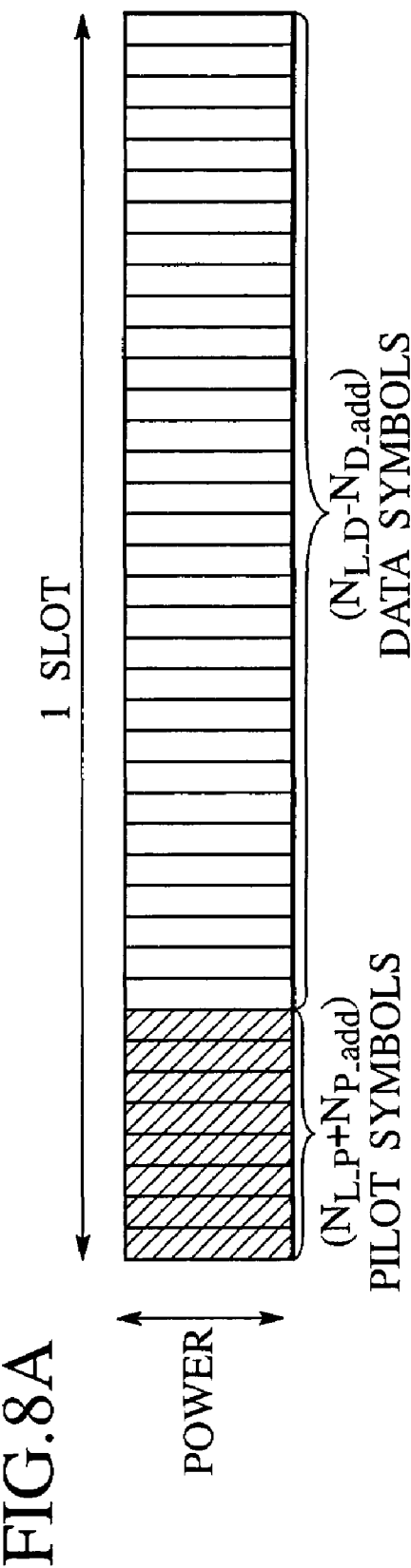
FIG. 8A is a diagram showing an example of formats of an individual channel for low speed used in the radio communication system according to the embodiment.
Figure 8B:
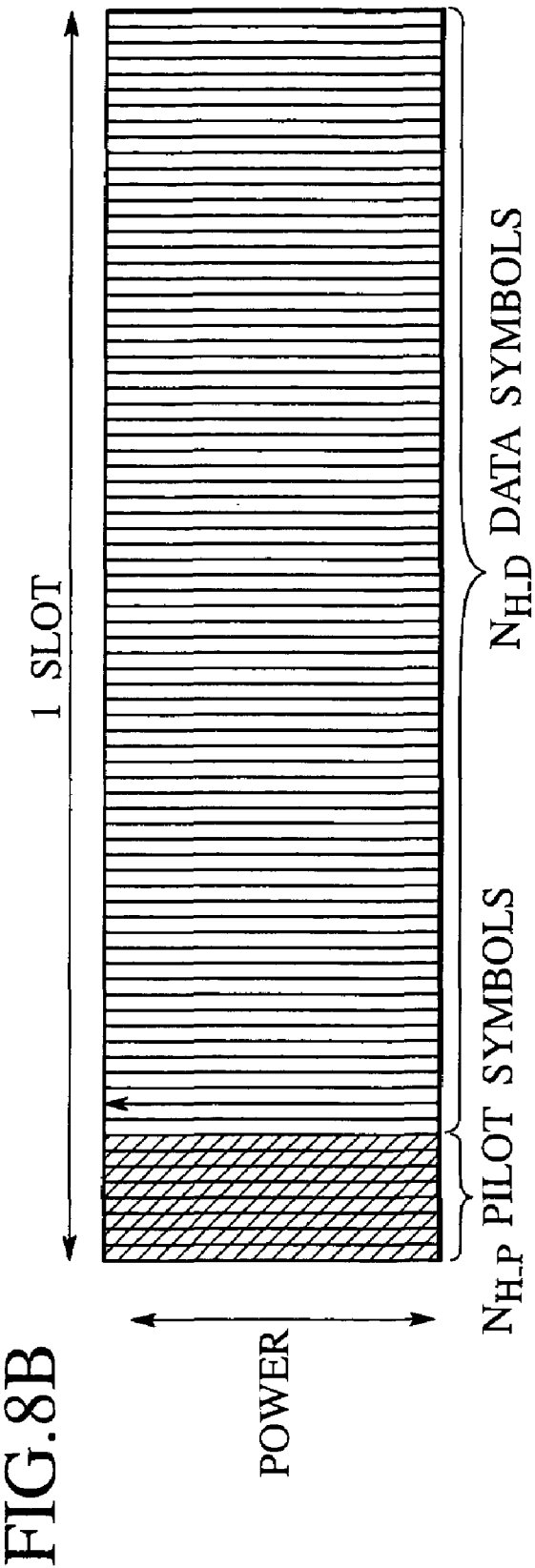
FIG. 8B is a diagram showing an example of formats of an individual channel for high speed used in the radio communication system according to the embodiment.

FIG. 8A shows an example of the format of the individual channel for low speed, FIG. 8B shows an example of the format of the individual channel for high speed.

As shown FIG. 8A, for example, the individual channel format creating unit 14 increases the number of pilot symbols which are to be inserted into one slot of the individual channel for low speed, from "$N_{L\_P}$" to "$N_{L\_P}+N_{P\_add}$".

The individual channel format creating unit 14 may change the format of the individual channel for high speed, by increasing the number of pilot symbols which are to be inserted into one slot of the individual channel for high speed, when the individual channel is transmitted using directional beams, and when the transmission rate of the individual channel is defined as "high speed".

In this case, the number of pilot symbols which are increased in the individual channel for high speed is set as smaller than the number of pilot symbols which are increased in the individual channel for low speed.

The total power of the pilot symbols in the individual channel for high speed is larger than the total power of the pilot symbols in the individual channel for low speed, so that the individual channel format creating unit 14 may not change the format of the individual channel for high speed, when the individual channel is transmitted using directional beams, and when the transmission rate of the individual channel is defined as "high speed".

The individual channel transmitting unit 15, which is connected to the individual channel format creating unit 14, is configured to transmit the individual channel into which the pilot symbols are inserted to the mobile station 30.

The individual channel transmitting unit 15 is configured to transmit the individual channel using directional beams or non-directional beams, in accordance with the result of a determination by the pilot channel controlling unit 12.

The common pilot channel transmitting unit 16, which is connected to the pilot channel controlling unit 12, is configured to insert the pilot symbols into the common pilot channel in accordance with the instruction from the pilot channel controlling unit 12, so as to transmit the common pilot channel to the mobile station 30.

Figure 9:
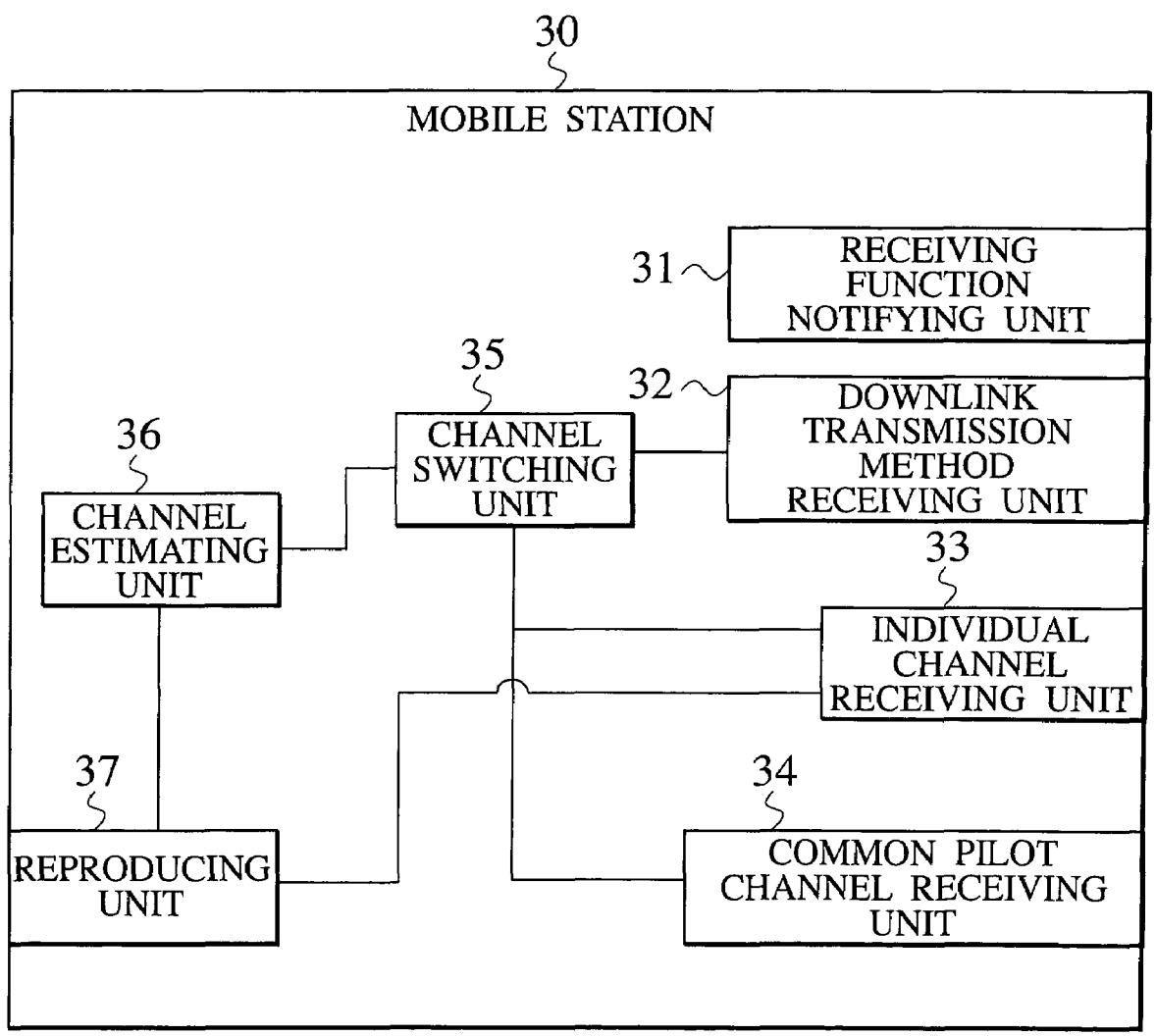
FIG. 9 is a functional block diagram of a first mobile station in the radio communication system according to the embodiment.

As shown FIG. 9, the mobile station 30 is configured with a receiving function notifying unit 31, a downlink transmission method receiving unit 32, an individual channel receiving unit 33, a common pilot channel receiving unit 34, a channel switching unit 35, a channel estimating unit 36 and a reproducing unit 37.

The receiving function notifying unit 31 is configured to notify a receiving function to the base station 10. The receiving function shows whether it is possible to receive directional beams or not.

The receiving function notifying unit 31 can transmit the receiving function showing that it is impossible to receive directional beams, when the mobile station 30 having a function of receiving directional beams cannot receive directional beams for some reason at this time, or when the mobile station does not have a function of receiving directional beams.

The downlink transmission method receiving unit 32, which is connected to the channel switching unit 35, is configured to receive the downlink transmission method from the base station 10, and transmit the downlink transmission method to the channel switching unit 35.

The individual channel receiving unit 33, which is connected to the channel switching unit 35, is configured to receive the individual channel from the base station 10, and transmit the individual channel to the channel switching unit 35. The individual channel receiving unit 33 can receive the individual channel transmitted from the base station 10 using directional beams and non-directional beams.

The common pilot channel receiving unit 34, which is connected to the channel switching unit 35, is configured to receive the common pilot channel from the base station 10, and transmit the common pilot channel to the channel switching unit 35.

The channel switching unit 35 is connected to the downlink transmission method receiving unit 32, the individual channel receiving unit 33 and the common pilot channel receiving unit 34. The channel switching unit 35 is configured to switch between channel estimation using pilot symbols inserted into an individual channel transmitted from the individual channel receiving unit 33 and channel estimation using pilot symbols inserted into a common pilot channel transmitted from the common pilot channel receiving unit 34, in accordance with the downlink transmission method transmitted from the downlink transmission method receiving unit 32.

To be more specific, the channel switching unit 35 determines to perform the channel estimation with the pilot symbols inserted into the individual channel when the channel switching unit 35 receives the downlink transmission method showing that the individual channel is transmitted using directional beams, and transmits the result of the determination to the channel estimating unit 36.

On the other hand, the channel switching unit 35 determines to perform the channel estimation with the pilot symbols inserted into the common pilot channel when the channel switching unit 35 receives the downlink transmission method showing that the individual channel is transmitted using non-directional beams, and transmits the result of the determination to the channel estimating unit 36.

The channel estimating unit 36, which is connected to the channel switching unit 35 and the reproducing unit 37, is configured to perform the channel estimation with the pilot symbols.

To be more specific, the channel estimating unit 36 is configured to perform the channel estimation with the pilot symbols inserted into the individual channel or the common pilot channel, in accordance with the result of the determination from the channel switching unit 35.

The reproducing unit 37, which is connected to the individual channel receiving unit 33 and the channel estimating unit 36, is configured to demodulate and reproduce the transmitted data from the data symbols included in the individual channel received by the individual channel receiving unit 33, using the channel estimation value transmitted from the channel estimating unit 36.

<An Operation of the Radio Communication System According to the Embodiment>

Referring to FIG. 10, the operation of the radio communication system according to the embodiment will be described.

As shown in FIG. 10, in step 601, the receiving function notifying unit 31 of the mobile station 30 notifies the receiving function showing whether it is possible to receive directional beams, to the base station 10. FIG. 11 shows the situation in which the step 601 is performed.

Is step 602, the pilot channel controlling unit 12 of the base station 10 judges whether the receiving function received via the receiving function notification receiving unit 11 shows that it is possible to receive directional beams or not.

If the receiving function shows that it is possible to receive directional beams, the individual channel format creating unit 14 of the base station 10 changes the format of the individual channel in step 603, and the downlink transmission method notifying unit 13 notifies the downlink transmission method showing that the individual channel is transmitted using directional beams to the mobile station 30 in step 604. FIG. 12 shows the situation in which the step 604 is performed.

For example, the individual channel format creating unit 14 changes the format of the individual channel, by increasing the number of pilot symbols which are to be inserted into the individual channel.

In step 605, the individual channel transmitting unit 15 transmits the individual channel to the mobile station 30 using directional beams. FIG. 13 shows the situation in which the step 605 is performed.

In step 606, the channel switching unit 35 determines to perform the channel estimation with the pilot symbols inserted into the individual channel in accordance with the downlink transmission method received by the downlink transmission method receiving unit 32, and the channel estimating unit 36 performs the channel estimation with the pilot symbols inserted into the individual channel received by the individual channel receiving unit 33 in accordance with the result of the determination.

On the other hand, if the receiving function shows that it is impossible to receive directional beams, the downlink transmission method notifying unit 13 of the base station 10 notifies the downlink transmission method showing that the individual channel is transmitted using non-directional beams to the mobile station 30 in step 607.

In step 608, the individual channel transmitting unit 15 of the base station 10 transmits the individual channel to the mobile station 30 using directional beams, and the common pilot channel transmitting unit 16 of the base station 10 transmits the common pilot channel to the mobile station 30 using non-directional beams.

In step 609, the channel switching unit 35 of the mobile station 30 determines to perform the channel estimation with the pilot symbols inserted into the common pilot channel in accordance with the downlink transmission method received by the downlink transmission method receiving unit 32, and the channel estimating unit 36 performs the channel estimation with the pilot symbols inserted into the common pilot channel received by the individual channel receiving unit 33 in accordance with the result of the determination.

In step 610, the reproducing unit 37 reproduces the transmitted data from the data symbols included in the individual channel, using the channel estimation value transmitted from the channel estimating unit 36.

<Functions and Effects of the Radio Communication System According to the Embodiment>

The radio communication system according to the embodiment allows the individual channel format creating unit 14 to change between a format of an individual channel transmitted using directional beams and a format of an individual channel transmitted using non-directional beams, so as to improve the accuracy of channel estimation with the individual channel transmitted from the base station 10 using directional beams.

The radio communication system according to the embodiment allows the downlink transmission method notifying unit 13 to notify the downlink transmission method, so that the mobile station 30 which can receive directional beams grasps whether directional beams are to be transmitted or not in a downlink in advance.

The radio communication system according to the embodiment allows the receiving function notifying unit 31 to notify the receiving function of each mobile station 30 to the base station 10, so that the base station 10 can judge whether directional beams or non-directional beams should be transmitted to each mobile station 30.

The radio communication system according to the embodiment allows the individual channel format creating unit 14 to change the format of the individual channel in accordance with transmission rate of the individual channel, so as to improve the accuracy of channel estimation with pilot symbols inserted into the individual channel for low speed.

The radio communication system according to the embodiment allows the individual channel format creating unit 14 to increase the number of pilot symbols which are to be inserted into one slot of the individual channel transmitted using directional beams, so as to improve the accuracy of channel estimation with pilot symbols inserted into the individual channel whose power is less than the power of the pilot symbols inserted into the common pilot channel.

<A Modification 1>

The present invention is not limited to the above embodiment, and the format of the individual channel which can be changed by the individual channel format creating unit 14 can be configured according to the format shown in FIG. 14A and FIG. 14B.

In other words, the individual channel format creating unit 14 of the base station 10 according to the modification is configured to change the format of the individual channel for low speed, by increasing the power of the pilot symbols which are to be inserted into the individual channel for low speed, when the individual channel is transmitted using directional beams, and when the transmission rate of the individual channel is defined as "low speed".

FIG. 14A shows an example of the format of the individual channel for low speed, and FIG. 14B shows an example of the format of the individual channel for high speed.

As shown in FIG. 14A, for example, the individual channel format creating unit 14 adds a power offset to the power of the pilot symbols which are to be inserted into the individual channel for low speed, so that the power of the pilot symbols is increased to M-times as large as the power of the data symbols.

The individual channel format creating unit 14 may change the format of the individual channel for high speed, by increasing the power of the pilot symbols which are to be inserted into the individual channel for high speed, when the individual channel is transmitted using directional beams, and when the transmission rate of the individual channel is defined as "high speed".

In this case, the power of the pilot symbols which is increased in the individual channel for high speed is set as less than the power of the pilot symbols which is increased in the individual channel for low speed.

The total power of the pilot symbols in the individual channel for high speed is larger than the total power of the pilot symbols in the individual channel for low speed, so that the individual channel format creating unit 14 may not change the format of the individual channel for high speed, when the individual channel is transmitted using directional beams, and when the transmission rate of the individual channel is defined as "high speed".

The radio communication system according to the modification 1 allows the individual channel format creating unit 14 to increase the power of the pilot symbols which are to be inserted into one slot of the individual channel transmitted using directional beams, so as to improve the accuracy of channel estimation with pilot symbols inserted into the individual channel whose power is less than the power of the pilot symbols inserted into the common pilot channel.

<A Modification 2>

The present invention is not limited to the above embodiment, and the operation of the individual channel format creating unit 14 can be changed as follows.

The individual channel format creating unit 14 according to the modification 2 is configured to increase the power of the pilot symbols which are to be inserted into the individual channel, when a mobile station 30 performs a hand-over communication with a plurality of base stations 10, and when the number of base stations 10 which transmit the individual channels using directional beams to the mobile station 30 is more than a predetermined number.

The modification assumes that the mobile station 30 performs a hand-over communication with three base stations 10#1 to 10#3, and the base stations 10#2 and 10#3 transmit the individual channels to the mobile station 30 using directional beams.

In this case, when the above predetermined number is set to be "1" or "2", the number of base stations 10 which transmit the individual channel to the mobile station 30 using directional beams is more than the predetermined number, so that the individual channel format creating unit 14 of the base station 10#2 and 10#3 changes the format of the individual channel.

Figure 15:
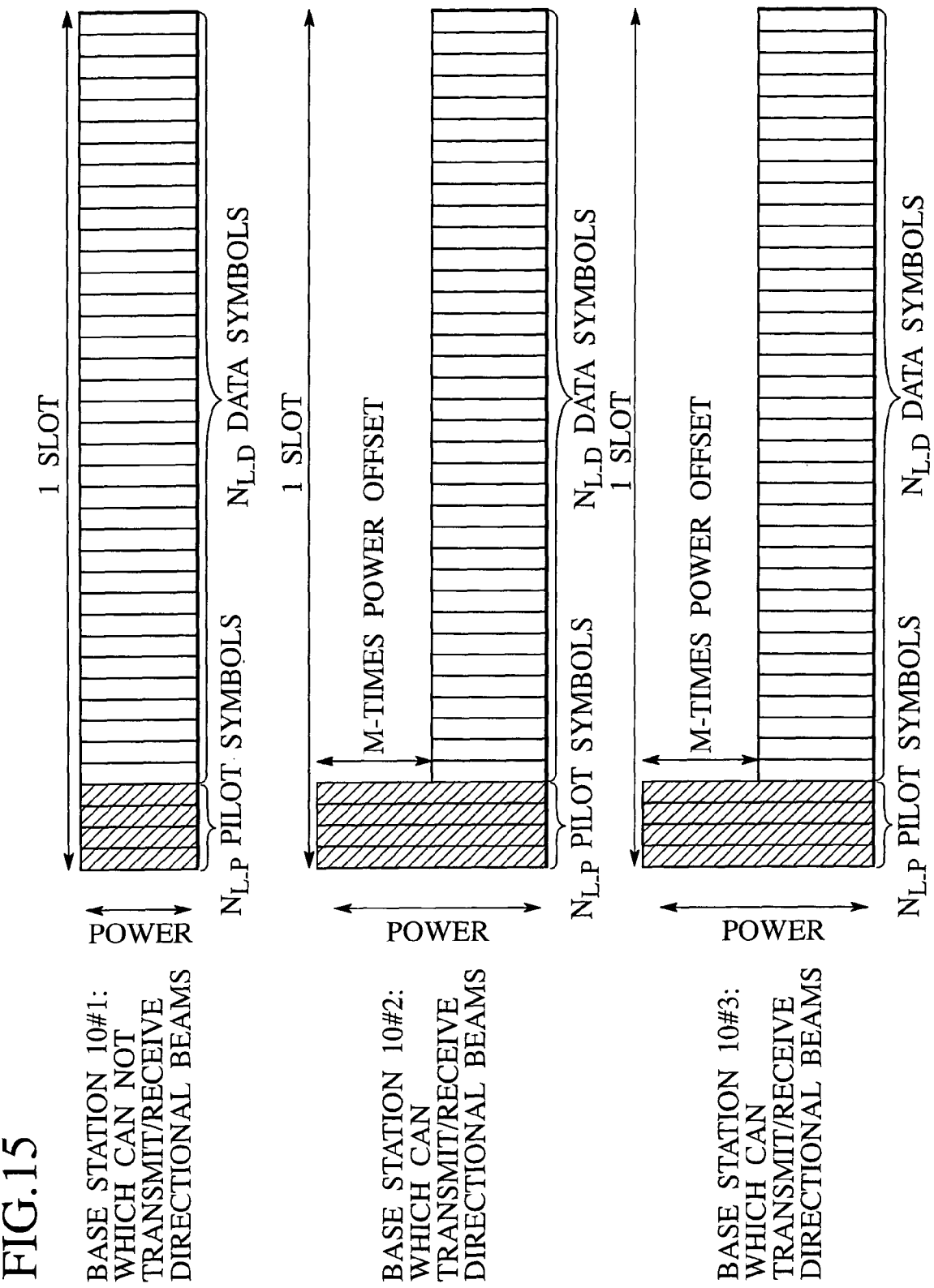
FIG. 15 is a diagram showing an example of formats of an individual channel used in the radio communication system according to a second modification.

As shown in FIG. 15, for example, the individual channel format creating unit 14 of the base station 10#2 and 10#3 adds the power offset to the power of the pilot symbols which are to be inserted into the individual channel, so that the power of the pilot symbols is increased to M-times as large as the power of the data symbols.

The individual channel format creating unit 14 of the base station 10#2 and 10#3 may increase the number of pilot symbols which are to be inserted into one slot of the individual channel.

The individual channel format creating unit 14 may change the format of the individual channel, just before the number of base stations 10 which transmit the individual channel to the mobile station 30 using directional beams is more than the predetermined number, or after the number of base stations 10 which transmit the individual channel to the mobile station 30 using directional beams is more than the predetermined number.

The present invention can provide a radio communication method which allows an improvement in the accuracy of channel estimation in a mobile station and an increase in downlink capacity by changing an individual channel format when a base station transmits an individual channel using directional beams, the base station and the mobile station preferably used for this method.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A radio communication method comprising the steps of:
    notifying a receiving function showing that it is possible to receive directional beams, from a first mobile station which can receive directional beams to a first base station which can receive directional beams;
    changing a format of an individual channel which is to be transmitted using directional beams by the first base station;
    notifying a downlink transmission method showing that directional beams are to be transmitted in a downlink, from the first base station to the first mobile station;
    transmitting the individual channel using directional beams, from the first base station to the first mobile station; and
    performing channel estimation using pilot symbols inserted into the individual channel, in accordance with the downlink transmission method.

2. A base station comprising:
    an individual channel transmitter configured to transmit an individual channel into which pilot symbols are inserted; and
    an individual channel format creator configured to create a format of the individual channel,
    and wherein the individual channel format creator changes between a format of an individual channel which is to be transmitted using directional beams and a format of an individual channel which is to be transmitted using non-directional beams.

3. The base station according to claim 2, further comprising:
    a downlink transmission method notifier configured to notify a downlink transmission method showing that directional beams or non-directional beams are to be transmitted in a downlink.

4. The base station according to claim 2, wherein the individual channel format creator changes the format of the individual channel, in accordance with transmission rate of the individual channel.

5. The base station according to claim 2, wherein the individual channel format creator increases the number of pilot symbols which are to be inserted into one slot of the individual channel, when the individual channel is transmitted using directional beams.

6. The base station according to claim 2, wherein the individual channel format creator increases the power of the pilot symbols which are to be inserted into the individual channel, when the individual channel is transmitted using directional beams.

7. The base station according to claim 2, wherein the individual channel format creator increases the power of the pilot symbols which are to be inserted into the individual channel, when a mobile station performs a hand-over communication with a plurality of base stations, and when the number of base stations which transmit the individual channels using directional beams to the mobile station is more than a predetermined number.

8. A mobile station comprising:

a channel estimator configured to perform channel estimation using pilot symbols;

a downlink transmission method receiver configured to receive a downlink transmission method showing that directional beams or non-directional beams are to be transmitted in a downlink;

a channel switcher configured to switch between channel estimation using pilot symbols inserted into an individual channel and channel estimation using pilot symbols inserted into a common pilot channel, in accordance with the downlink transmission method.

9. The mobile station according to claim 8, further comprising:

a receiving function notifier configured to notify a receiving function showing whether it is possible to receive directional beams or not.

* * * * *